(12) United States Patent
Rosenberg (10) Patent No.: US 10,484,851 B2
(45) Date of Patent: Nov. 19, 2019

(54) COMMUNICATING INFORMATION BETWEEN APPLICATIONS EXECUTING ON A CLIENT DEVICE VIA AUTHENTICATION INFORMATION GENERATED BY AN APPLICATION

(71) Applicant: VenueNext, Inc., Santa Clara, CA (US)

(72) Inventor: Edan Rosenberg, Princeton Jct., NJ (US)

(73) Assignee: VenueNext, Inc., Santa Clara, CA (US)

( * ) Notice: Subject to any disclaimer, the term of this patent is extended or adjusted under 35 U.S.C. 154(b) by 274 days.

(21) Appl. No.: 15/389,180

(22) Filed: Dec. 22, 2016

(65) Prior Publication Data

US 2018/0181767 A1 Jun. 28, 2018

(51) Int. Cl.
*G06F 15/16* (2006.01)
*H04W 4/50* (2018.01)
*H04W 4/021* (2018.01)
*H04W 12/06* (2009.01)
*H04L 29/08* (2006.01)
*H04L 29/06* (2006.01)
*G06F 21/44* (2013.01)
(Continued)

(52) U.S. Cl.
CPC .............. *H04W 4/50* (2018.02); *G06F 21/44* (2013.01); *H04L 63/08* (2013.01); *H04L 63/0807* (2013.01); *H04L 67/146* (2013.01); *H04W 4/021* (2013.01); *H04W 12/06* (2013.01); *H04L 67/306* (2013.01); *H04W 12/00503* (2019.01); *H04W 12/00514* (2019.01); *H04W 12/02* (2013.01);

(58) Field of Classification Search
None
See application file for complete search history.

(56) References Cited

U.S. PATENT DOCUMENTS

2006/0121901 A1* 6/2006 Tanaka .................. H04W 36/22
455/436
2007/0011099 A1* 1/2007 Sheehan ................. G06Q 20/32
705/65

(Continued)

*Primary Examiner* — Umar Cheema
*Assistant Examiner* — Gregory P Tolchinsky
(74) *Attorney, Agent, or Firm* — Fenwick & West LLP (57) ABSTRACT

An application associated with an online system executing on a client device identifies an additional application on the client device with which the application may exchange information. To exchange information between the application and additional application, the online system receives a request for authentication information from the application that identifies the additional application and a user of the application. The online system generates and stores authentication information in association with an identifier associated with the user by the application and with an identifier of the additional application. After communicating the authentication information to the client device, the online system receives a request to verify the authentication information from the additional application. If the authentication information is verified, the online system stores an association between an identifier associated with the user by the additional application that was included in the request and the identifier associated with the user by the application.

17 Claims, 3 Drawing Sheets

(51) Int. Cl.
*H04W 12/02* (2009.01)
*H04W 12/00* (2009.01)

(56) References Cited

U.S. PATENT DOCUMENTS

| | | | | |
|---|---|---|---|---|
| 2007/0025342 | A1* | 2/2007 | Obata | H04L 45/34 370/352 |
| 2009/0186700 | A1* | 7/2009 | Konkle | A63J 25/00 463/42 |
| 2013/0198851 | A1* | 8/2013 | Spies | H04L 9/0625 726/26 |
| 2014/0082715 | A1* | 3/2014 | Grajek | H04L 63/083 726/8 |
| 2015/0195268 | A1* | 7/2015 | Fang | H04L 63/0807 726/9 |
| 2015/0323791 | A1* | 11/2015 | Scheer | G06F 3/0488 345/173 |
| 2015/0355893 | A1* | 12/2015 | Luk | G06F 8/62 717/178 |
| 2016/0019499 | A1* | 1/2016 | Bhalodia | G06Q 10/0833 705/40 |
| 2016/0366122 | A1* | 12/2016 | Rykowski | H04L 63/0815 |
| 2017/0178034 | A1* | 6/2017 | Skeen | G06F 16/168 |
| 2017/0178457 | A1* | 6/2017 | Franco Munoz | G07F 17/32 |
| 2018/0176203 | A1* | 6/2018 | Wang | H04L 67/141 |

* cited by examiner

COMMUNICATING INFORMATION BETWEEN APPLICATIONS EXECUTING ON A CLIENT DEVICE VIA AUTHENTICATION INFORMATION GENERATED BY AN APPLICATION

BACKGROUND

This invention relates generally to applications executing on a client device, and more specifically to exchanging information between applications executing on a client device.

Many online systems are associated with applications that execute on client devices to present content from the online systems to users or to communicate information received from users to the online system. For example, an application associated with an online system presents content from the online system and also receives information from the user that is communicated to the online system 140 for storage in association with the user. Presenting and receiving information via an application allows an online system to more frequently and easily communicate with its users.

Many users interact with different online systems through various applications associated with the online systems executing on client devices associated with the user. For example, a client device associated with a user executes an application associated with an online system as well as an additional application associated with an additional online system. The online system and additional online system may have a relationship with each other allowing exchange of information between the online system and the additional online system to increase user interaction with both the online system and the additional online system. For example, the online system may leverage certain information associated with the user by the additional online system when selecting content or providing functionality to the user via the application associated with the online system.

However, different online systems commonly use different information to identify users, with an application associated with an online system using information used by the online system to identify the user. Hence, applications associated with different online systems use different information to identify a user. This use of different identifying information by applications associated with different online systems impairs exchange of information between different applications on a client device. For example, when an application associated with an online system requests information from an additional application that is associated with a different online system, the user of the application is often prompted by the additional application to provide login credentials to allow access to information associated with the user by the online system associated with the additional application. This additional interaction by the user may reduce user interaction with the application or with the additional application.

SUMMARY

An application associated with an online system, such as a venue management system, executing on a client device associated with a user identifies an additional application on the client device with which the application may exchange information. For example, the application includes information identifying various additional applications authorized by the online system to exchange information with the application. The application compares information identifying additional applications on the client device from an operating system of the client device or from an application manager on the client device to the additional applications identified by the information included in the application and identifies an additional application having identifying information matching identifying information included in the application. In some embodiments, the application identifies the additional application when the application is launched. Alternatively, the application identifies the additional application in response to one or more conditions being satisfied. For example, the application identifies the additional application if a location of the client device is within a geographic location associated with a venue, such as a venue associated with the application.

To exchange information between the application and additional application, the online system receives a request for authentication information from the application that identifies the additional application and includes information used by the application to identify the user. For example, the application communicates the request for authentication information to the online system in response to the user accessing a link presented by the application prompting the user to allow the application and the additional application to exchange information. The online system generates and stores authentication information, such as an access token, in association with information used by the application to identify the user and with an identifier of the additional application. Subsequently, the online system communicates the authentication information to the application executing on the client device.

The application communicates the authentication information to the additional application, which communicates a request to verify the authentication information to the online system that also includes information used by the additional application to identify the user. If the authentication information is verified, the online system stores an association between the information used by the additional information to identify the user and the information used by the application to identify the user. Subsequently, the online system may identify the information used by the application to identify the user associated with the information used by the additional application received from the additional application to identify the user and retrieve content maintained by the online system for communication to the additional application.

BRIEF DESCRIPTION OF THE DRAWINGS

FIG. 1 is a block diagram of a venue, in accordance with an embodiment of the.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

Venue Overview

Figure 1:
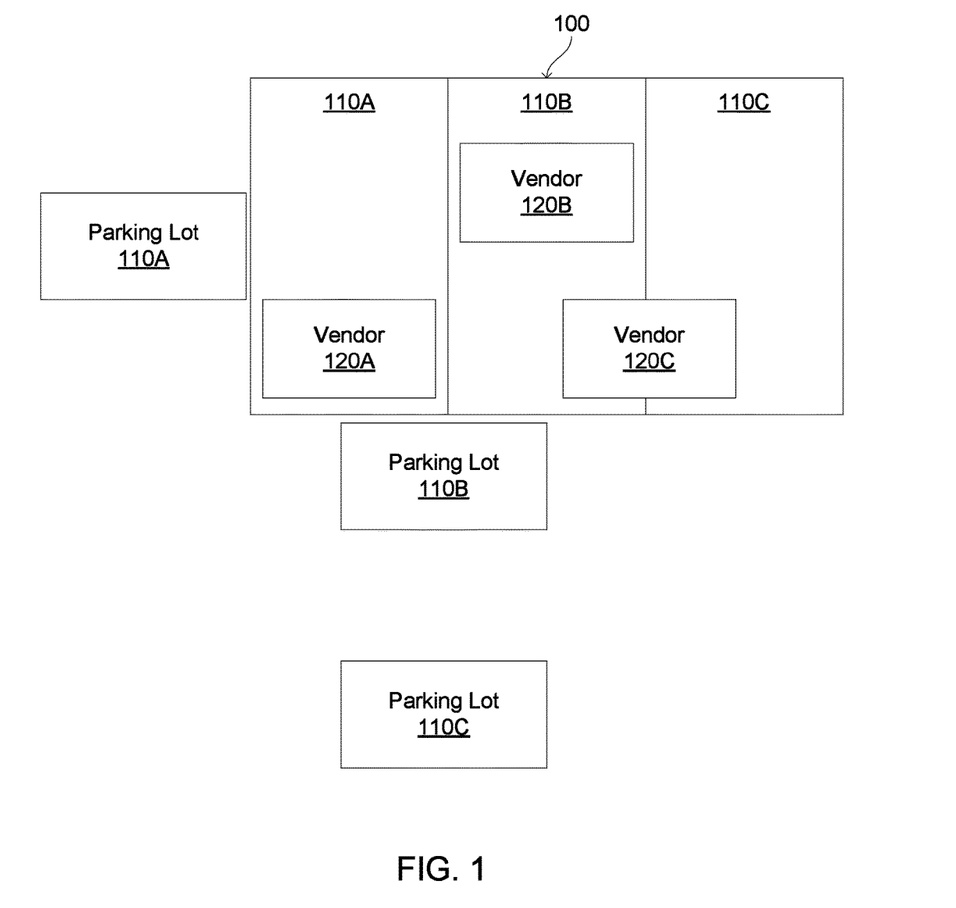

FIG. 1 is a block diagram of one embodiment of a venue 100. In the example of FIG. 1, the venue includes multiple regions 110A, 110B, 110C (also referred to individually and collectively using reference number 110). Additionally, one or more vendors 120A, 120B, 120C (also referred to individually and collectively using reference number 120) are included in the venue 100, and one or more parking lots 130A, 130B, 130C (also referred to individually and collectively using reference number 130) are associated with the venue 100. However, in other embodiments, different and/or additional components may be associated with or included in the venue 100.

The venue 100 is a geographic location, such as a geographic location associated with one or more structures. Examples of a venue 100 include a stadium, a convention center, an arena, a theater, an amphitheater, or other suitable structure. One or more regions 110 are included in the venue 100, with each region 110 corresponding to an area within the venue 100. For example, different regions 110 correspond to different sections of a stadium, different aisles of a stadium or arena, different rooms in a convention center, or any other suitable area within the venue 100. In some embodiments, an area within the venue 100 is associated with multiple regions 110 having different levels of precision. For example, a specific seat in a venue 100 is associated with a region 110 identifying a section including the seat, another region 110 identifying an aisle within the section including the seat, and an additional region identifying the specific seat. While FIG. 1 shows an example venue 100 including three regions 110A, 110B, 110C, in other embodiments, a venue 110 may include any number of regions 110.

One or more vendors 120 are included in the venue 110, with each vendor providing products or services to users within the venue 110. Examples of vendors 120 include restaurants, food service providers, beverage providers, merchandise retailers, or other suitable entities providing products or services. Different vendors 120 may be associated with different regions 110 of the venue. For example, a vendor 120A is associated with a region 110A, while a different vendor 120B is associated with a different region 110B. A vendor 110 may be associated with multiple regions 110; for example, a vendor 110C is associated with a region 110B as well as with an additional region 110C. In some embodiments, a vendor 120 is associated with a region 110 based on a distance between the vendor 120 and the region 110. For example, the vendor 120 is associated with a region 110 having a minimum distance from a location associated with the vendor 120. If a location associated with a vendor 120 is within a region 110, the vendor 120 is associated with the region 110 including the vendor's associated location.

Additionally, one or more parking lots 130A, 130B, 130C are associated with the venue 110 and identify physical locations for parking vehicles. Each parking lot includes one or more spaces, each space for parking a vehicle. A price is associated with each parking lot 130 specifying an amount of compensation a user provides to an entity associated with the venue 110 for a space in the parking lot 130 to be allocated for parking a vehicle associated with the user. Different parking lots 130 may have different distances from the venue 110, and prices associated with different parking lots 130 may be inversely proportional to a distance between a parking lot 130 and the venue 110. Each parking lot 130 is also associated with a capacity specifying a maximum number of vehicles that may be parked in a parking lot 130. The capacity may be total number of spaces in the parking lot 130 or may be a maximum number of vehicles. Information may be maintained by one or more devices included in a parking lot 130 specifying a number of spaces in the parking lot 130 in which vehicles are parked, specifying a number of vehicles within a geographic area associated with the parking lot 130, or any other suitable information. For example, a device included in the parking lot 130 increments a counter when a vehicle enters the geographic area associated with the parking lot 130 or when a vehicle is parked in a space of the parking lot 130.

System Architecture

Figure 2:
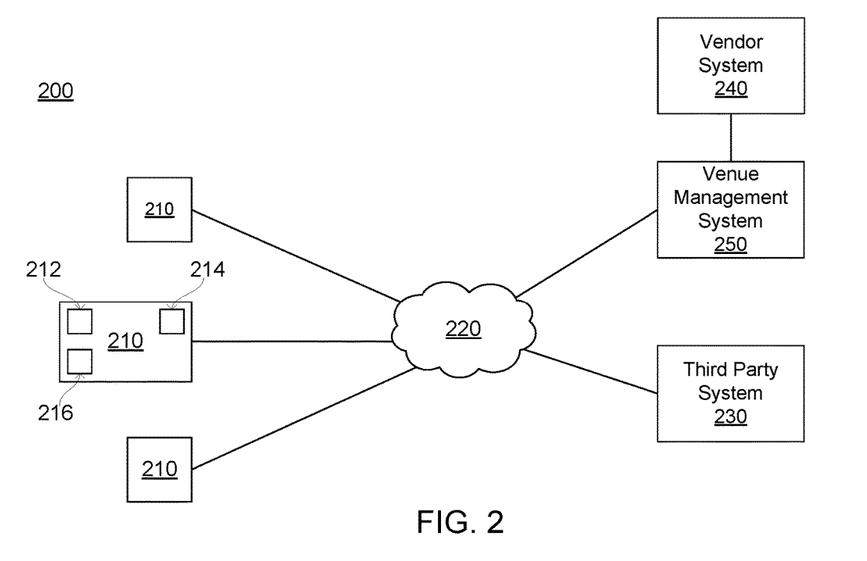
FIG. 2 is a block diagram of a system environment including a venue management system, in accordance with an embodiment.

FIG. 2 is a block diagram of a system environment 200 for a venue management system 250. The system environment 200 shown by FIG. 1 includes various client devices 210, a network 220, a third party system 230, one or more vendor systems 240, and a venue management system 250. In alternative configurations, different and/or additional components may be included in the system environment 200. The embodiments described herein may be adapted to online systems other than venue management systems.

A client device 210 is one or more computing devices capable of receiving user input as well as transmitting and/or receiving data via the network 220. In one embodiment, the client device 210 is a conventional computer system, such as a desktop computer or a laptop computer. Alternatively, the client device 210 may be a device having computer functionality, such as a personal digital assistant (PDA), a mobile telephone, a smartphone or another suitable device. A client device 210 is configured to communicate with other devices via the network 220. In one embodiment, the client device 210 executes an application allowing a user of the client device 210 to interact with the venue management system 250. For example, the client device 210 executes a browser application to enable interaction with the venue management system 250 or with one or more third party system 230 via the network 220. In another embodiment, a client device 210 interacts with the venue management system 250 through an application programming interface (API) running on a native operating system of the client device 210, such as IOS® or ANDROID™.

A display device 212 included in a client device 210 presents content items to a user of the client device 210. Examples of the display device 212 include a liquid crystal display (LCD), an organic light emitting diode (OLED) display, an active matrix liquid crystal display (AMLCD), or any other suitable device. Different client devices 210 may have display devices 212 with different characteristics. For example, different client devices 212 have display devices 212 with different display areas, different resolutions, or differences in other characteristics.

One or more input devices 214 included in a client device 210 receive input from the user. Different input devices 214 may be included in the client device 210. For example, the client device 210 includes a touch-sensitive display for receiving input data, commands, or information from a user. Using a touch-sensitive display allows the client device 210 to combine the display device 212 and an input device 214, simplifying user interaction with presented content items. In other embodiments, the client device 210 may include a keyboard, a trackpad, a mouse, or any other device capable of receiving input from a user. Additionally, the client device may include multiple input devices 214 in some embodiments. Inputs received via the input device 214 may be processed by an application associated with the venue management system 250 and executing on the client device

210 to allow a client device user to exchange information with the venue management system 250.

Additionally, a client device 210 may include one or more position sensors 216, which determine a physical location associated with the client device 210. For example, a position sensor 216 is a global positioning system (GPS) sensor that determines a location associated with the client device 210 based on information obtained from GPS satellites communicating with the GPS sensor, such as coordinates specifying a latitude and longitude of the location associated with the client device 210. As another example, a position sensor 216 determines a location associated with the client device 210 based on intensities of signals received from one or more access points (e.g., wireless access points) by the client device 110. In the preceding example, the position sensor 216 determines a location associated with the client device 210 based on signal intensity between the client device 210 and one or more wireless access points and service set identifiers (SSIDs) or media access control (MAC) addresses of the wireless access points. However, the client device 210 may include any suitable type of position sensor 216. In various embodiments, the client device 210 may include multiple position sensors 216.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 130 may be coupled to the network 220 for communicating with one or more client devices 110 or with the venue management system 250. In one embodiment, a third party system 230 is an application provider communicating information describing applications for execution by a client device 210 or communicating data to client devices 110 for use by an application executing on the client device 210. For example, a third party system 230 is associated with an application executing on a client device 210 and communicates information from the third party system 230 to the application for presentation; additionally, the application may communicate information received from the user to the third party system 230 for association with the user by the third party system 230. In other embodiments, a third party system 230 provides content or other information for presentation via a client device 210. For example, a third party system 230 provides content related to an event occurring at the venue 110 to a client device 210 for presentation to a user; as an example, the third party system 230 provides video or audio data of a portion of an event occurring at the venue to a client device 210, allowing a user associated with the client device 210 to view the portion of the event from an alternative vantage point than the user's vantage point or to hear commentary about the portion of the event. As another example, a third party system 230 is a social networking system maintaining connections between various users and providing content for presentation to users based at least in part on the maintained connections. A third party system 230 may also communicate information to the venue management system 250, which subsequently communicates the information, or a portion of the information, to one or more client devices 110 via the network 220.

Additionally, one or more vendor systems 240 are coupled to the venue management system 250 via the network 220 or through direct connections between the vendor systems 240 and the vendor management system 150. A vendor system 240 is associated with a vendor 120 and receives orders for products or services from the venue management system 250 and provides the products or services identified by the orders. Further, a vendor system 240 provides the venue management system 250 with information describing fulfillment of orders by a vendor 120 associated with the vendor system 240. For example, the vendor system 240 provides information to the venue management system 250 specifying an estimated time to fulfill subsequently received or pending orders for products or services, an average time in which previously received orders were fulfilled, a number of unfulfilled orders received by the vendor system 240, or other suitable information. Information provided from the vendor system 240 to the vendor management system 150 accounts for orders received via the vendor management system 150 as well as orders received by the vendor 120 associated with the vendor system 240 from users visiting a location associated with the vendor 120.

Additionally, a vendor system 240 may provide information to the venue management system 250 describing products or services sold by a vendor 120 associated with the vendor system 240. For example, the vendor system 240 identifies a number of different products or services 140 sold by the vendor 120 or identifies an amount of revenue received by the vendor 120 in exchange for different products or services. Information describing sold products or services may be communicated from the vendor system 240 to the venue management system 250 as the products or services are sold or may be communicated from the vendor system to the venue management system 250 at periodic intervals. Additionally, the venue management system 250 may request information describing sales of products or services to a vendor system 240, which provides the requested information to the venue management system 250 in response to receiving the request.

The venue management system 250, which is further described below in conjunction with FIG. 3, receives content from one or more third party systems 230 or from one or more client devices 210 or generates content and provides content to users via an application associated with the venue management system 250 and executing on client devices 210. Additionally, the venue management system 250 maintains information associated with one or more parking lots 130 associated with a venue 100, such as a number of spaces in a parking lot 130 currently occupied, a price associated with a the parking lot 130, or a number of spaces in the parking lot 130 that have been purchased, as well as directions for navigating to a location associated with the parking lot 130. The venue management system 250 may communicate certain information associated with a parking lot 130 to one or more users, such as the price associated with the parking lot 130 or directions to the location associated with the parking lot 130. Associations between one or more vendors 120 and regions 110 of the venue 100 are also included in the venue management system 250, which also receives orders for products or services from one or more users and communicates the orders to one or more vendors 120 for fulfillment.

Figure 3:
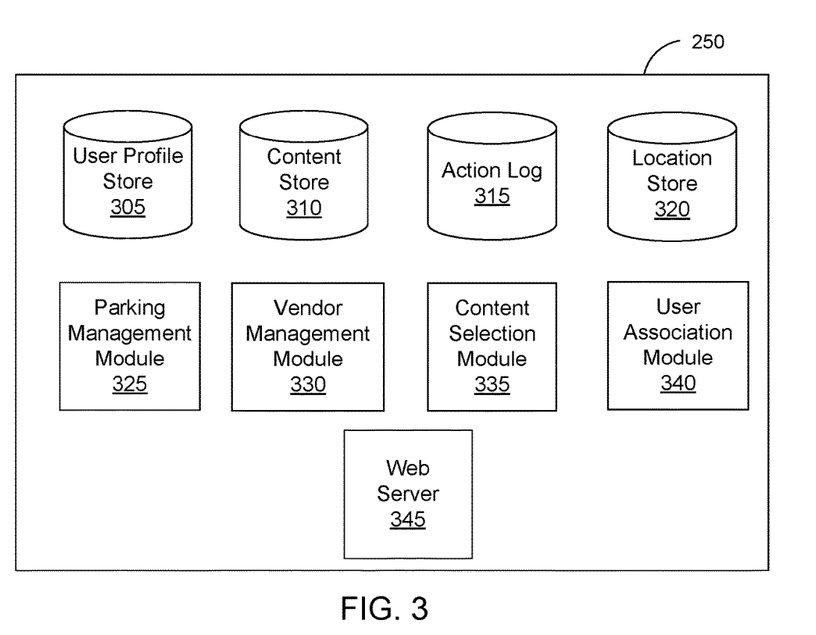
FIG. 3 is a block diagram of a venue management system, in accordance with an embodiment.

FIG. 3 is a block diagram of an architecture of a venue management system 250. The venue management system 250 shown in FIG. 3 includes a user profile store 305, a content store 310, an action log 315, a location store 320, a parking management module 325, a vendor management module 330, a content selection module 335, a user association module 340, and a web server 345. In other embodiments, the venue management system 250 may include additional, fewer, or different components for various applications. Conventional components such as network interfaces, security functions, load balancers, failover servers, management and network operations consoles, and the like are not shown so as to not obscure the details of the system architecture.

Each user of the venue management system 250 is associated with a user profile, which is stored in the user profile store 305. A user profile includes declarative information about the user provided by the user and may also include information inferred by the venue management system 250 from actions associated with the user or from other information. In one embodiment, a user profile includes multiple data fields, each describing one or more attributes of the corresponding user. Examples of information stored in a user profile include demographic information, contact information, preferences, and location information. For example, a user profile identifies a region 110 of the venue 100 associated with a user, such as a region 110 including a seat associated with a ticket to attend the venue 100 associated with the user. A user profile may also store other information provided by the user, for example, image data or video data. Additionally, a user profile in the user profile store 205 may also maintain references to actions by the corresponding user performed on content presented by the venue management system 250 or interactions between the corresponding user captured by one or more vendor systems 240 and communicated to the venue management system 250. For example, a user profile identifies prior orders for products or services the venue management system 250 received from a user and communicated to one or more vendor systems 150.

In some embodiments, a user profile includes a status associated with the user. The venue management system 250 may provide different functionality to a user based on the user's status. For example, the venue management system 250 communicates certain types of messages to client devices 210 associated with users having a specific type of status and does not communicate the certain types of messages to client devices 210 associated with users that do not have the specific type of status. As another example, the venue management system 250 presents less advertisement content to users having specific statuses. The status may be based on a frequency with which the user is associated with tickets to attend the venue 100 or an amount of money the venue management system 250 has received from the user (e.g., based on an amount the user has spent on tickets to attend the venue 100). Additionally, a user may provide an amount of compensation to the venue management system 250 for a specific status to be associated with the user. For example, the user provides the venue management system 250 with an amount of compensation per year or per month for the venue management system 250 to associate a specific status with the user.

The content store 310 stores objects that each represents various types of content received from one or more third party systems 230 or generated by the venue management system 250. Examples of content represented by an object include video data associated with an event occurring at the venue 100, image data associated with an event occurring at the venue 100, audio data associated with an event occurring at the venue 100, text data associated with an event occurring at the venue 100, information associated with the venue 100 or with the location of the venue 100, or other suitable. Additionally, content may be received from applications associated with a third party system 230 and executing on client devices 210 associated with users of the venue management system 230. In one embodiment, objects in the content store 210 represent single pieces of content, or content "items."

The action log 315 stores information describing actions performed by venue management system users internal to or external to the venue management system 250. For example, actions performed by a user on a third party system 230 that communicates information to the venue management system 250 are stored in the action log 315 along with information describing actions performed by the user through the venue management system 250. Examples of actions include: ordering a product or service from a vendor 120 included in the venue 100, checking-into the venue, accessing content provided by the venue management system 250 or provided by a third party system 230 that communicates with the venue management system 250, providing a review of a product, service, or vendor 120 to the venue management system 250 or to a third party system 230 that communicates with the vendor management system 250, providing a comment associated with the venue 100 or with an event occurring at the venue 100 to the venue management system 250 or to a third party system 230 that communicates with the venue management system 250. However, any suitable action may be stored in the action log 315 and associated with a user profile in the user profile store 305. Information in the action log 315 may identify the user performing an action, a type of the action, a description of the action, a time associated with the action, or any other suitable information. In some embodiments, data from the action log 315 is used to infer interests or preferences of a user, augmenting interests included in the user's user profile and allowing a more complete understanding of user preferences.

The action log 315 may also store user actions taken on a third party system 230, such as an external website, and communicated to the venue management system 250. For example, an e-commerce website may recognize a user of the venue management system 250 through a plug-in enabling the e-commerce website to identify the venue management system user. Because users of the venue management system 250 are uniquely identifiable, third party systems 230 may communicate information about a user's actions outside of the venue management system 250 to the venue management system 250 for association with the user. Hence, the action log 315 may record information about actions users perform on a third party system 230, such as purchases made, comments on content, or other information a user authorizes a third party system 230 to communicate to the vendor management system 250.

The location store 320 includes physical locations associated with various regions 110 of the venue 100. In various embodiments, the location store 320 includes a region identifier associated with each region 110 and information identifying a geographic area associated with the region identifier. Any suitable information may identify the geographic area associated with a region identifier. Example information identifying a geographic area of a region 110 include: physical coordinates specifying boundaries of a region 110 and an identifier of a portion of the venue 100 including the region 110. Additionally, the location store 320 includes data associating vendors 120 with one or more regions 110 of the venue 100. A vendor identifier uniquely associated with a vendor 120 is associated with a region identifier, with the association stored in the location store 320. Multiple vendors 120 may be associated with a region 110 of the venue 100.

In some embodiments, the location store 320 also associates location information with users of the venue management system 250. A client device 210 communicates location information to the venue management system 250, which may store the location information in the location store 320 or in the user profile store 305 in association with the user. Based on the received information, the venue management system 250 may determine a region 110 of the venue including the location information and associate the region identifier of the determined region with a user profile corresponding to the user. If the venue management system 250 receives modified location information from the client device 210, the venue management system 205 may modify the determined region 110 if a different region includes the modified location information. Alternatively, one or more sensors included in the venue 100 identify a client device 210 and determine a location associated with the client device 210. Based on the determined location, the venue management system 250 identifies a region 110 including the client device 110 and stores a region identifier of the region 110 in association with a user identifier of a user associated with the client device 210. In various embodiments, information identifying a location associated with the client device 210 (e.g., latitude and longitude) is also stored in the location store 320 in association with an identifier associated with the user associated with the client device 210. Additionally, the venue management system 250 may assign a location to a user and store the assigned location in association with the user in the location store 320. For example, when a user purchases a ticket to enter the venue 100, the ticket is associated with a location assigned to the user, and the location store 320 includes information associating the location assigned to the user from the ticket with an identifier associated with the user.

The parking management module 325 includes information identifying parking lots 130 associated with the venue and describing various parking lots 130. Each parking lot 130 is associated with a lot identifier that uniquely identifies a parking lot 130. Characteristics of a parking lot 130 are stored in the parking management module 325 in association with a lot identifier corresponding to the parking lot 130. Characteristics of a parking lot 130 include a capacity for the parking lot 130 that specifies a maximum number of vehicles capable of being parked in the parking lot 130 and a price associated with the parking lot 130 for allocating a space in the parking lot 130 to a vehicle. Additional characteristics of a parking lot 130 include one or more locations associated with the parking lot 130 (e.g., entrances) and directions to the location associated with the parking lot 130. Directions from one or more locations associated with the parking lot 130 to the venue 100 may also be maintained by the parking management module 325.

Certain characteristics of a parking lot 130 are modified based on information is received by the venue management system 250. As users purchase spaces in a parking lot 130, the parking management module 325 maintains a number of purchased spaces associated with the parking lot 130. Additionally, when a vehicle enters a parking lot 130, information is communicated from the parking lot to the venue management system 250, where the parking management module 325 maintains a number of vehicles currently occupying the parking lot 130 or a number of currently occupied spaces in the parking lot 130. In some embodiments, a ticket is scanned or other information is captured by a device (e.g., scanner, card reader, terminal) when a vehicle enters the parking lot 130; the device communicates an indication that information was captured to the venue management system 250, causing the parking management module 325 to increment a number of spaces in the parking lot 130 currently associated with vehicles or to increment a number of currently occupied spaces in the parking lot 130. Thus, the parking management module 325 maintains a number of spaces in a parking lot 130 that are currently occupied by vehicles and modifies the number of currently occupied spaces as vehicles are parked in the parking lot.

Based on a number of spaces currently associated with vehicles in various parking lots 130, the parking management module 325 may communicate messages to client devices 210 identifying one or more of the parking lots 130. In one embodiment, the parking management module 325 selects a parking lot 130 based on a difference between a number of previously purchased spaces in the parking lot 130 and a number of currently occupied spaces in the parking lot 130. For example, the parking management module 325 selects a parking lot 130 having at least a threshold difference between a number of previously purchased spaces and a number of currently occupied spaces, which indicates there are at least the threshold number of unoccupied spaces in the selected parking lot 130. To increase the number of vehicles in the selected parking lot 130, the parking management module 325, the parking management module communicates a message to client devices 110 associated with one or more users identifying the selected parking lot. The message may indicate a number of unoccupied spaces in the selected parking lot 130 as well as the price associated with the selected parking lot 130. In some embodiments, the parking management module 325 modifies the price associated with the selected parking lot 130 to encourage users to park vehicles in spaces of the selected parking lot. The parking management module 235 may also modify a price associated with the selected parking lot 130 to encourage users to park vehicles in spaces of the selected parking lot 130. For example, the parking management module 325 decreases a price of the selected parking lot 130 to increase likelihoods of users purchasing spaces in the selected parking lot 130. Communicating messages identifying a parking lot 130 to users is further described below in conjunction with FIG. 4.

The parking management module 325 also receives information describing traffic conditions within a threshold distance of the parking lot 130 associated with the user and determines the directions for communication to the user based at least in part on the traffic conditions. Information describing the traffic conditions includes a number of currently occupied spaces in one or more additional parking lots 130, such as additional parking lots 130 within a threshold distance of the parking lot 130 associated with the user. Based on the information describing the traffic conditions, the parking management module 325 may modify the directions to one or more locations associated with the parking lot associated with the user. For example, the parking management module 325 modifies the directions to a location associated with the parking lot 130 to avoid one or more additional parking lots 130 with at least a threshold number of currently occupied spaces or to avoid one or more geographic regions having at least a threshold number or density of vehicles. As traffic conditions change, the parking management module 325 may further modify the direction to a location associated with the parking lot 130 and communicate the further modified directions to the client device 210 associated with the user, allowing a user to bypass congestion when travelling to the parking lot 130 associated with the user.

The vendor management module 330 receives orders for products or services from client devices 210 associated with users and communicates the orders to one or more vendor systems 240 of vendors 120 associated with the venue 100. In various embodiments, the vendor management module 330 includes vendor profiles each associated with one or more vendors 120 associated with the venue 100. A vendor profile includes a vendor identifier uniquely identifying a vendor 120 and additional information associated with the vendor 120, such as one or more regions 110 of the venue 100 associated with the vendor 120 and information for communicating with a vendor system 240 associated with the vendor 120. Further examples of information associated with the vendor 120 and included in a vendor profile include: contact information, hours of operation, a listing of products or services provided by the vendor 120, a current inventory or products maintained by the vendor 120, and a current time for the vendor 120 to fulfill received orders. However, in other embodiments, additional or different information may be included in the vendor profile. One or more users authorized by the venue management system 250 may communicate information to the vendor management system 330 to modify regions 110 of the venue associated with one or more vendors 120.

When the vendor management module 330 receives an order identifying a product or service and identifying a vendor 120 from a user, the vendor management system 330 communicates the order to a vendor system 240 corresponding to the identified vendor 120. The vendor 120 may subsequently deliver the product or service identified by the order to the user or may communicate a notification to the user via the venue management system 250 when the order is fulfilled. To expedite delivery of products or services, the vendor management module 330 may associate different vendors 120 with different regions 110 of the venue 100 to reduce time for users to receive products or services delivered by vendors 120. The vendor management module 330 may modify regions 110 of the venue 100 associated with a vendor 120 by modifying identifiers of regions 110 included in a vendor profile of a vendor 120. In some embodiments, the vendor management module 330 modifies regions 110 associated with a vendor 120 based on a number or a frequency of orders received from users associated with different regions 110 as well as a time to fulfill orders by different vendors 120, products or services offered by different vendors 120 or a number of orders received by different vendors 120. When modifying regions 110 associated with a vendor 120 or vendors 120 associated with a region, the venue management system 330 may account for products or services provided by various vendors 120 so similar products or services are provided to users in a region 110 before and after modification of the vendors 120 associated with the region 110.

Additionally, the vendor management module 330 receives information from a vendor system 240 and communicates the information to one or more client devices 210 for presentation to users. For example, the vendor system 240 communicates a time to fulfill an order, an estimated time to fulfill an order, a number of previously received orders that have yet to be fulfilled, or other suitable information to the vendor management module 330, which provides at least a subset of the information to a client device 210 for presentation to a user. As another example, a vendor system 240 communicates a message to the venue management module 330 including a user identifier, an order identifier (or a description of an order), and an indication that an order corresponding to the order identifier has been fulfilled by a vendor. The vendor management module 330 identifies a user corresponding to the user identifier from the user profile store 305 and communicates the message to a client device 210 associated with the user.

As vendors 120 may deliver products to users in various regions 110 of the venue 100 to fulfill orders received from various users, in some embodiments, the vendor management module 330 regulates communication of orders received from client devices 210 associated with users to vendor systems 240 associated with various vendors 120. When the vendor management module 330 receives an order for a product or a service from a client device 210 associated with a user, the vendor management module 330 stores the received order in a queue for a specified time interval before communicating the order to a vendor system 240 corresponding to a vendor 120 identified by the order. If the vendor management system 330 receives additional orders from users having one or more characteristics matching or similar to the order stored in the queue and identifying the vendor 120 identified by the order while the order is stored in the queue, the vendor management module 330 generates a group including the additional orders and the order stored in the queue and communicates the group or orders to a vendor system 240 associated with the vendor 120 to be fulfilled. For example, the vendor management system 330 generates a group including additional orders associated with users having a location matching a location of a user associated with an order stored in the queue. As additional examples, the vendor management system 330 generates a group including orders identifying products or services matching, or similar to, a product or service specified by an order stored in the queue or generates a group including orders identifying products or services having times for fulfillment within a threshold value of a time for fulfillment of the order stored in the queue. Communicating a group of orders having one or more matching or similar characteristics to a vendor system 240 allows the vendor 120 associated with vendor system 240 to more efficiently fulfill orders from users.

The content selection module 335 selects one or more content items for communication to a client device 210 for presentation to a user. Content items eligible for presentation to the user are retrieved from the content store 310, from a third party system 230, or from another source, by the content selection module 335, which selects one or more of the content items for presentation to the user. A content item eligible for presentation to the viewing user is a content item associated with at least a threshold number of targeting criteria satisfied by characteristics of the user or is a content item that is not associated with targeting criteria. For example, a content item associated with targeting criteria specifying a threshold distance of the venue 100 is identified as eligible for presentation to users associated with locations within a threshold distance of the venue 100. As another example, a content item associated with targeting criteria specifying attendance of an event at the venue 100 is identified as eligible for presentation to users attending the event or who have indicated they will attend the event. In various embodiments, the content selection module 335 includes content items eligible for presentation to the user in one or more selection processes, which identify a set of content items for presentation to the user. For example, the content selection module 335 determines a measure of relevance of various content items to a user based on characteristics associated with the user by the venue management system 250 based on actions associated with the user by the venue management system 250, characteristics of the user maintained by the venue management system 250, preferences of the user maintained by the venue management system 250, and characteristics of content items eligible for presentation to the user. For example, the content selection module 335 determines measures of relevance to a user based on characteristics of the content items, characteristics of the user, and actions associated with the user. Based on the measures of relevance, the content selection module 335 selects one or more content items for presentation to the user (e.g., content items having at least a threshold measure of relevance, content items having highest measures of relevance relative to other content items). In some embodiments, the content selection module 335 ranks content items based on their associated measures of relevance and selects content items having the highest positions in the ranking or having at least a threshold position in the ranking for presentation to the user.

A content item may be associated with bid amounts specifying an amount of compensation received by the venue management system 250 from a third party system 130 or from a user if one or more criteria associated with the content item are satisfied. For example, a bid amount associated with a content item specifies an amount of compensation received by the venue management system 250 when the content item is presented to a user or when a user presented with the content item performs a specified type of interaction with the content item. The content selection module 335 uses the bid amounts associated with various content items when selecting content for presentation to the user. In various embodiments, the content selection module 335 determines an expected value associated with various content items based on their bid amounts and selects content items associated with a maximum expected value or associated with at least a threshold expected value for presentation to the user. An expected value associated with a content item represents an expected amount of compensation to the venue management system 250 for presenting a content item. For example, the expected value associated with a content item is a product of the content item's bid amount and a likelihood of the user interacting with the content item. The content selection module 335 may rank content items associated with bid amounts separately than content items that are not associated with bid amounts and select content items for presentation based on the separate rankings (e.g., content items having at least a threshold position in a ranking).

The user association module 340 maintains associations between information used by the venue management system 250 to identify a user and information used by one or more other third party systems 230 to identify the user. In various embodiments, the user association module 240 maintains identifiers of applications associated with third party systems 230 or identifiers of third party systems 230 that are authorized to retrieve information from the venue management system 250 or to provide information to the venue management system 250. The user association module 340 provides the identifiers of the applications or third party systems 230 to an application associated with the venue management system 250 executing on a client device 210. If the application associated with the venue management system 250 identifies an additional application executing on the client device 210 matching an identifier from the venue management system 250, the application associated with the venue management system 250 transmits a request for authentication information identifying the additional application to the user association module 340. As further described below in conjunction with FIG. 4, the venue management system generates authentication information for the additional application and stores the authentication information in association with information used by the application to identify a user and with information identifying the additional application. The user association module 340 communicates the authentication information 435 to the application associated with the venue management system 250 that executes on the client device 210, which launches the additional application and communicates the authentication information to the additional application. Subsequently, the additional application communicates a request to verify the authentication information, which includes information used by the additional application to identify the user, to the user association module 340. If the user association module 340 verifies the authentication information included in the request to verify the authentication information, the user association module 340 stores an association between information used by the application to identify the user and the information used by the additional application to identify the user. As further described below in conjunction with FIG. 4, the additional application 410 may subsequently request information associated with the user from the application or from the venue management using the information used by the additional application to identify the user, from which the user association module 340 identifies the associated information used by the application to identify the user and retrieves information associated with the information used by the application to identify the user.

The web server 345 links venue management system 250 via the network 220 to one or more client devices 210, as well as to one or more third party systems 230. Additionally, the web server 345 may exchange information between the venue management system 250 and one or more vendor systems 240. The web server 345 serves web pages, as well as other content, such as JAVA®, FLASH®, XML and so forth. The web server 345 may receive and route messages between the venue management system 250 and a client device 210, for example, instant messages, queued messages (e.g., email), text messages, short message service (SMS) messages, or messages sent using any other suitable messaging technique. A user may send a request to the web server 345 to upload information (e.g., images or videos) that are stored in the content store 310. Additionally, the web server 345 may provide application programming interface (API) functionality to send data directly to native client device operating systems, such as IOS®, ANDROID™, WEBOS® or BlackberryOS.

Figure 4:
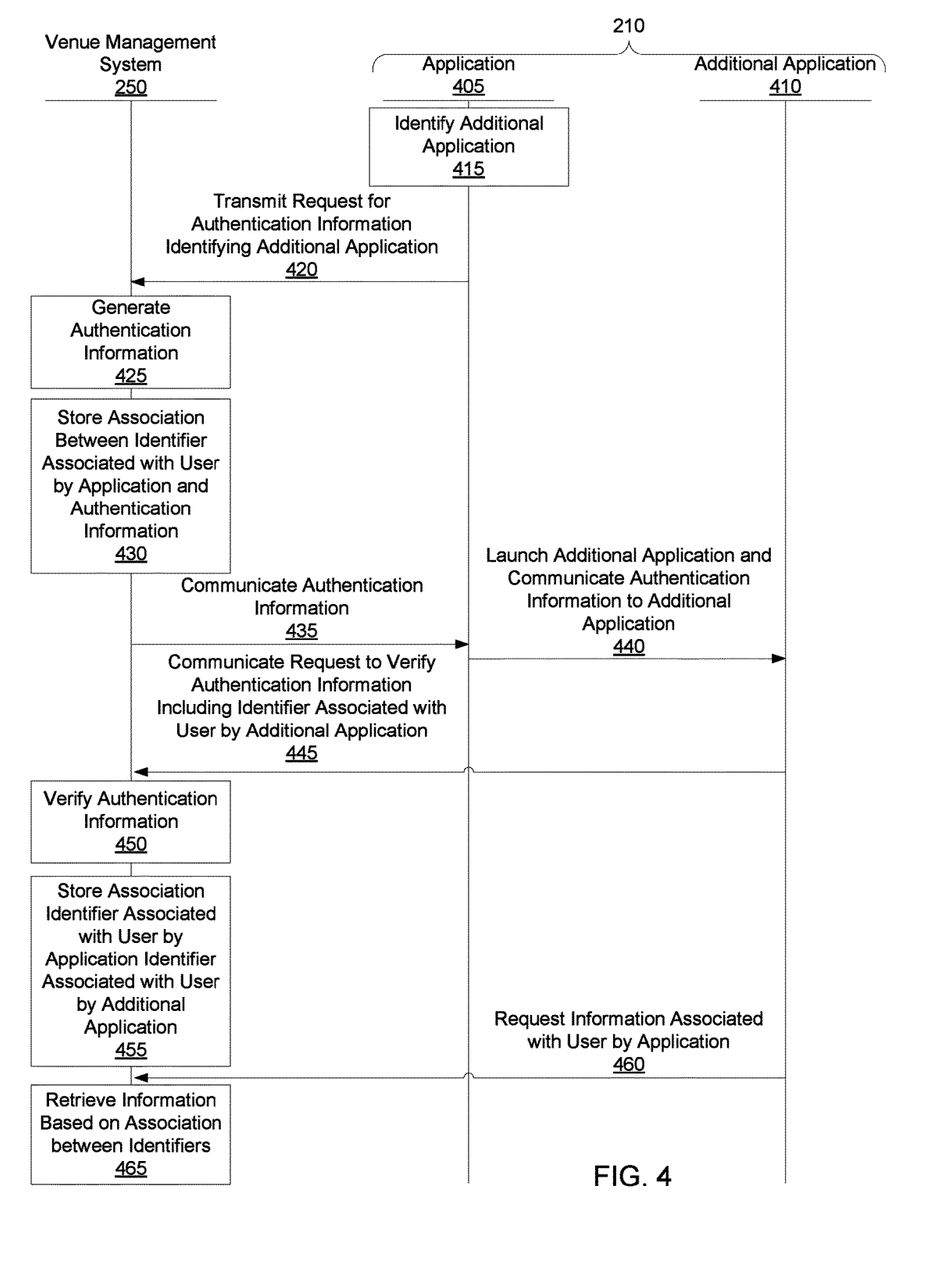
FIG. 4 is an interaction diagram of a method for communicating information associated with a user between an application and an additional application executing on a client device, in accordance with an embodiment.

Enabling Applications Executing on a Client Device to Exchange Information with Each Other FIG. 4 is an interaction diagram of one embodiment of a method for communicating information associated with a user of the venue management system 250 between an application associated with the venue management system 250 and an additional application executing on a client device 210. In various embodiments, the method may include different or additional steps than those described in conjunction with FIG. 4. Additionally, steps of the method may be performed in different orders than the order described in conjunction with FIG. 4 in some embodiments.

In the example of FIG. 4, an application 405 and an additional application 410 execute on a client device 210. For purposes of illustration, FIG. 4 shows an example where the application 405 is associated with a venue management system 250. However, in other embodiments, the application may be associated with any suitable online system, such as an online system that maintains information describing a user of the online system or information describing actions performed by a user of the online system.

The application 405 identifies 415 the additional application executing on the client device 210. In various embodiments, the application 405 includes identifiers of one or more additional applications with which the application 405 is authorized by the venue management system 250 to exchange information. For example, the application 405 includes identifiers of one or more additional application associated with a common entity as the application 405 or associated with entities having relationships with the venue management system 250 allowing exchange of information between the entities and the venue management system 250. In various embodiments, the venue management system 250 communicates information to the application 405 updating the identifiers of the one or more additional applications. For example, the venue management system 250 communicates information for updating the identifiers stored by the application 405 when the venue management system 250 identifies another additional application or removes an additional application form exchanging information with the application 405. As another example, the venue management system 250 periodically communicates updated identifiers of one or more additional applications to the application 405.

In one embodiment, the application 405 identifies 415 the additional application 410 when the application 405 is launched on the client device 210. For example, the application 405 requests information identifying applications installed on the client device 210 from an operating system or application manager executing on the client device 210 when the application is launched on the client device 210 and compares information identifying applications installed on the client device 210 to identifiers of applications authorized by the venue management system 250 to exchange information with the application 405. The application 405 identifies 415 the additional application 410 if information identifying the additional application matches an identifier stored by the application 405 identifying an additional application authorized to exchange information with the application 405.

Alternatively, the application 405 identifies 415 the additional application 410 in response to one or more conditions being satisfied. For example, the application 405 requests information identifying applications installed on the client device 210 from an operating system or application manager executing on the client device 210 when a location of the client device 210 is within a threshold location of a location of a venue 100 (e.g., a venue 100 associated with the application) or when a location of the client device 210 is within a geographic location associated with the venue 100 (e.g., a venue 100 associated with the application). In other embodiments, the application 405 identifies 415 the additional application 410 in response to any other suitable condition being satisfied.

In some embodiments, after identifying 415 the additional application 410, the application 405 presents a prompt for establishing a connection between the application 405 and the additional application 410 to a user of the client device. For example, the application 405 presents information specifying the additional application 410 and a link that, when accessed by the user, transmits 420 a request for authentication information from the application 405 to the venue management system 250. Alternatively, the application 405 transmits 420 the request for authentication information to the venue management system 250 in response to identifying 415 the additional application 410. For example, the application 405 associates one or more settings with the user authorizing the application 405 to communicate information with one or more additional applications identified 415 by the application 405. The request transmitted 420 by the application includes information identifying the additional application 410 and information used by the application 405 to identify the user. For example, the request includes an identifier of the additional application 410 and a user identifier associated with the user by the application 405.

In response to receiving the request for authentication information from the application 405, the venue management system 250 generates 425 authentication information including login information or other credentials for accessing the venue management system 250. For example, the authentication information is an access token. The venue management system 250 stores 430 an association between the authentication information, information used by the application 405 to identify the user, and information identifying the additional application 410. For example, the venue management system 250 stores the authentication information in association with a user identifier associated with the user by the application 405 and with an identifier of the additional application 410.

The venue management system 250 communicates 435 the authentication information to the application 405 executing on the client device 110. In some embodiments, the venue management system 250 generates an obfuscated version of the authentication information and communicate 435 the obfuscated version of the authentication information to the application 405. For example, the venue management system 250 generates the obfuscated version of the authentication information by applying a hash function to the authentication information (e.g., an access token) and communicates 435 the obfuscated version of the authentication information to the application 405. In some embodiments, the venue management system 250 generates a link identifying the additional application 410 and one or more instructions for execution by the client device 210 to configure the additional application 410 to a specific state. A state of the additional application 410 identifies data received by the additional application 410, so the link communicates the authentication information to the additional application 410.

After receiving the authentication information from the venue management system 250, the application 405 communicates with the client device 210 to launch 440 the additional application 410 and to communicate the authentication information to the additional application 410. In some embodiments, the application 405 receives a link from the venue management system 410 including information identifying the additional application 410 and one or more instructions that, when executed by the client device 210, launch the application and communicate the authentication information to the additional application 410. In response to the user accessing the link, instructions in the link are executed by the client device 210, which launches 440 the additional application 410 while communicating the authentication information to the additional application 410. Alternatively, the application 405 receives the authentication information from the venue management system 250 along with instructions that, when executed by the client device 210, launch 440 the additional application 410 and communicate the authentication information to the additional application 410; the application 405 causes the client device 210 to execute the instructions upon receiving the instructions, launching 440 the additional application 410 and communicating the authentication information to the additional application 410. In other embodiments, the application 405 generates a link generates a link identifying the additional application 410 and one or more instructions for execution by the client device 210 to configure the additional application 410 to a specific state where the authentication information is communicated to the additional application 410. The application 405 presents the generated link to the user and executes the instructions in the link in response to the user accessing the link.

When the additional application 410 receives the authentication information, the additional application communicates 445 a request to verify the authentication information to the venue management system 250. The request to verify the authentication information includes an identifier associated with the user by the additional application 410. In some embodiments, the additional application 410

The venue management system 250 verifies 450 the authentication information in the request to verify the authentication information matches the authentication information stored 430 by the venue management system 250 in association with information identifying the additional application 410. If the venue management system 250 verifies 450 the authentication information in the request to verify the authentication information, the venue management system 250 stores 455 an association between the identifier associated with the user by the additional application 410 included in the request to verify the authentication information in association with the identifier associated with the user by the application 405. The association between the identifier associated with the user by the additional application 410 included in the request to verify the authentication information in association with the identifier associated with the user by the application 405 allows the additional application 410 to request information associated with the user by the venue management system 250, which is associated with the application 405, by communicating the identifier associated with the user by the additional application 410. Based on the stored association, the venue management system 250 identifies the identifier associated with the user by the application 405, allowing the venue management system 250 to retrieve information associated with the user based on the identifier associated with the user by the application 405.

For example, the additional application 410 communicates 460 a request for information associated with the user to the venue management system 250 that includes the identifier associated with the user by the additional application 410. The venue management system 410 identifies a stored association including the identifier associated with the user by the additional application 410 and identifies the identifier associated with the user by the application 405 based on the stored association. Using the identifier associated with the user by the application 405, which is associated with the venue management system 250, the venue management system 250 retrieves 465 information associated with the user and communicates the retrieved information to the additional application 410. In some embodiments, the venue management system 250 encrypts the retrieved information using any suitable method and communicates the encrypted information to the additional application 410, which decrypts the information.

As another example, the additional application 410 communicates information to the venue management system 250 for association with the user in a request including the information and information identifying the user to the additional application 410. The venue management system 250 identifies information identifying the user to the application 405 that is associated with the information identifying the user to the additional application 410 and stores the information in association with the information identifying the user to the application 405. In some embodiments, the additional application 410 encrypts the information and communicates the encrypted information to the venue management system 250, which decrypts the information, identifies information identifying the user to the application 405 associated with the information identifying the user to the additional application 410, and stores the information in association with the information identifying the user to the application 405.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online system including a processor, a request for authentication information to access the online system from an application executing on a client device, the request identifying an additional application executing on the client device and a user of the application via a user identifier associated with the user by the application, the additional application different from the application;
generating the authentication information in response to the received request;
storing an association between the authentication information and the user identifier associated with the user by the application at the online system;
communicating the authentication information from the online system to the application executing on the client device;
receiving, at the online system, a request to verify the authentication information from the additional application executing on the client device, the request to verify the authentication information including an additional identifier associated with the user by the additional application; and
storing an association between the additional identifier associated with the user by the additional application and the user identifier associated with the user by the application at the online system in response to the online system verifying the authentication information from the additional application.

2. The method of claim 1, wherein receiving, at the online system, the request for the authentication information from the application comprises:
receiving the request for the authentication information from the application from a client device on which the application is installed having a location within a threshold distance of a location associated with a venue associated with the application.

3. The method of claim 1, wherein receiving, at the online system, the request for the authentication information from the application comprises:
receiving the request for the authentication information from the application from a client device on which the application is installed having a location within a geographic location associated with a venue associated with the application.

4. The method of claim 1, wherein receiving, at the online system, the request for the authentication information from the application comprises:
receiving the request for the authentication information from the application from a client device on which the application is installed that launches the application.

5. The method of claim 1, wherein communicating the authentication information from the online system to the application executing on the client device comprises:
generating an obfuscated version of the authentication information; and
communicating the obfuscated version of the authentication information to the application.

6. The method of claim 5, wherein generating the obfuscated version of the authentication information comprises:
applying a hash function to the authentication information.

7. The method of claim 1, wherein the authentication information comprises an access token.

8. The method of claim 1, further comprising:
receiving a request for information associated with the user by the application from the additional application, the request for information including the additional identifier associated with the user by the additional application;
determining the identifier associated with the user by the application from the stored association;
retrieving the information associated with the user by the application based on the user identifier associated with the user by the application; and
communicating the information to the additional application.

9. The method of claim 8, wherein communicating the information to the additional application comprises:
encrypting the information; and
communicating the encrypted information to the additional application.

10. The method of claim 1, further comprising:
receiving a request to store information in association with the user from the additional application, the request including the information and including the additional identifier associated with the user by the additional application;
determining the user identifier associated with the user by the application from the stored association; and
storing the information included in the request in association with the identifier associated with the user by the application.

11. The method of claim 1, wherein communicating the authentication information from the online system to the application executing on the client device comprises:
communicating a link identifying the additional application and including the authentication information, the link including instructions that, when executed by a client device on which the application is installed, launch the additional application and communicate the authentication information to the additional application.

12. A computer program product comprising a non-transitory computer readable storage medium having instructions encoded therein on that, when executed by a processor included in a client device, cause the processor to:
identify an additional application executing on the client device, the additional application associated with an application executing on the client device associated with a user, the additional application different from the application;
determine the identified application is installed on the client device;
receive a request for the application and the additional application to exchange information, the request identifying the additional application and a user identifier associated with the user by the application;

responsive to receiving the request for the application and the additional application to exchange information, communicate a request for authentication information to access an online system associated with the application to the online system associated with the application, the request for authentication information identifying the additional application and identifying the user of the application via the user identifier associated with the user by the application;

receive the authentication information generated by the online system from the online system associated with the application after the online system stores an association between the authentication information and the user identified associated with the user by the application;

launch the additional application and communicate the authentication information to the additional application; and communicate a request to verify the authentication information from the additional application to the online system associated with the application, the request to verify the authentication information including an additional identifier associated with the user by the additional application, wherein the online system stores an association between the additional identifier associated with the user by the additional application and the user identifier associated with the user by the application at the online system in response to the online system verifying the authentication information from the additional application.

13. The computer program product of claim 12, wherein identify the additional application executing on the client device, the additional application associated with the application executing on the client device comprises:
   identify an additional application associated with an identifier matching an identifier included in the application in response to the client device launching the application.

14. The computer program product of claim 12, wherein identify the additional application executing on the client device, the additional application associated with the application executing on the client device comprises:
   identify an additional application associated with an identifier matching an identifier included in the application in response to a location of the client being within a threshold distance of a venue associated with the application.

15. The computer program product of claim 12, wherein identify the additional application executing on the client device, the additional application associated with the application executing on the client device comprises:
   identify an additional application associated with an identifier matching an identifier included in the application in response to a location of the client being within a geographic location of a venue associated with the application.

16. The computer program product of claim 12, wherein launch the additional application and communicating the authentication information received from the online system to the additional application comprises:
   present a link identifying the additional application and including the authentication information to the user, the link including instructions that, when executed by the client device on which the application is installed, launch the additional application and communicate the authentication information to the additional application; and
   execute the instructions in the link in response to the user accessing the link.

17. The computer program product of claim 12, wherein receive the request for the application and the additional application to exchange information comprises:
   present a prompt to the user to establish a connection between the application and the additional application via the client device, the prompt including a link; and
   identify the user accessed the link.

* * * * *